US008180855B2

(12) United States Patent
Aiello et al.

(10) Patent No.: US 8,180,855 B2
(45) Date of Patent: May 15, 2012

(54) COORDINATED SHARED STORAGE ARCHITECTURE

(75) Inventors: Anthony F. Aiello, Santa Clara, CA (US); Radek Aster, Campbell, CA (US); Randal Thelen, Mountain View, CA (US); George Kong, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 969 days.

(21) Appl. No.: 11/075,619

(22) Filed: Mar. 8, 2005

(65) Prior Publication Data
US 2006/0206671 A1    Sep. 14, 2006

Related U.S. Application Data

(60) Provisional application No. 60/647,563, filed on Jan. 27, 2005.

(51) Int. Cl.
G06F 15/16 (2006.01)
(52) U.S. Cl. ........................................................ 709/219
(58) Field of Classification Search .................... 709/219
See application file for complete search history.

(56) References Cited

U.S. PATENT DOCUMENTS

| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,163,131 A | 11/1992 | Row et al. |
| 5,355,453 A | 10/1994 | Row et al. |
| 5,426,747 A | 6/1995 | Weinreb et al. |

(Continued)

FOREIGN PATENT DOCUMENTS
WO    WO 89/10594    11/1989
(Continued)

OTHER PUBLICATIONS

Baker et al. Non-Volatile Memory for Fast, Reliable File Systems. Proceedings of the 5th International Conference on Architectural Support for Programming Languages and Operating Systems. Oct. 1992.*

(Continued)

Primary Examiner — John MacIlwinen
(74) Attorney, Agent, or Firm — Cesari and McKenna, LLP

(57) ABSTRACT

The present invention provides a novel coordinated shared storage architecture that permits the amortization of cost of the spares over any number of the storage systems and enables improvements to a number of storage system operations. The coordinated shared storage architecture comprises a plurality of storage systems disk shelves via a plurality of intermediate network devices, such as hubs. Each storage system includes a storage operating system having a target device driver module. The target device driver module permits the storage system to function as a SCSI target and thereby receive and process commands directed to it from other storage systems.

28 Claims, 10 Drawing Sheets

U.S. PATENT DOCUMENTS

| | | | |
|---|---|---|---|
| 5,485,579 | A | 1/1996 | Hitz et al. |
| 5,568,629 | A | 10/1996 | Gentry et al. |
| 5,581,724 | A | 12/1996 | Belsan et al. |
| 5,802,366 | A | 9/1998 | Row et al. |
| 5,819,292 | A | 10/1998 | Hitz et al. |
| 5,835,700 | A | 11/1998 | Carbonneau et al. |
| 5,892,955 | A | 4/1999 | Ofer |
| 5,894,588 | A | 4/1999 | Kawashima et al. |
| 5,931,918 | A | 8/1999 | Row et al. |
| 5,941,972 | A | 8/1999 | Hoese et al. |
| 5,963,962 | A | 10/1999 | Hitz et al. |
| 5,975,738 | A | 11/1999 | DeKoning et al. |
| 6,038,570 | A | 3/2000 | Hitz et al. |
| 6,065,037 | A | 5/2000 | Hitz et al. |
| 6,078,990 | A | 6/2000 | Frazier |
| 6,128,734 | A | 10/2000 | Gross et al. |
| 6,209,023 | B1 | 3/2001 | Dimitroff et al. |
| 6,425,035 | B2 | 7/2002 | Hoese et al. |
| 6,516,380 | B2 | 2/2003 | Kenchammana-Hoskote et al. |
| 6,594,698 | B1 | 7/2003 | Chow et al. |
| 6,598,174 | B1 | 7/2003 | Parks et al. |
| 6,629,062 | B2 | 9/2003 | Coffey et al. |
| 6,636,879 | B1 | 10/2003 | Doucette et al. |
| 6,643,654 | B1 | 11/2003 | Patel et al. |
| 6,654,902 | B1 | 11/2003 | Brunelle et al. |
| 6,708,265 | B1 | 3/2004 | Black |
| 6,757,695 | B1 | 6/2004 | Noveck et al. |
| 6,785,742 | B1 | 8/2004 | Teow et al. |
| 6,961,767 | B2 | 11/2005 | Coffey et al. |
| 6,975,590 | B2 | 12/2005 | Killen et al. |
| 6,976,083 | B1 | 12/2005 | Baskey et al. |
| 6,988,136 | B2 | 1/2006 | Sicola et al. |
| 7,089,293 | B2 | 8/2006 | Grosner et al. |
| 7,107,385 | B2 | 9/2006 | Rajan et al. |
| 7,110,414 | B2 | 9/2006 | Coffey |
| 7,146,522 | B1 | 12/2006 | Rowe et al. |
| 7,194,597 | B2 | 3/2007 | Willis et al. |
| 7,216,188 | B2 | 5/2007 | Reid et al. |
| 7,260,678 | B1 | 8/2007 | Agarwal et al. |
| 7,260,737 | B1 | 8/2007 | Lent |
| 7,281,072 | B2 | 10/2007 | Liu et al. |
| 7,296,068 | B1* | 11/2007 | Sarma et al. .................. 709/223 |
| 7,305,670 | B2 | 12/2007 | Ogasawara et al. |
| 7,366,808 | B2 | 4/2008 | Kano et al. |
| 7,444,396 | B2 | 10/2008 | King et al. |
| 7,610,295 | B2 | 10/2009 | Pooni et al. |
| 7,711,683 | B1 | 5/2010 | Watanabe et al. |
| 7,725,558 | B2 | 5/2010 | Dickenson |
| 2002/0044561 | A1 | 4/2002 | Coffey |
| 2002/0044562 | A1 | 4/2002 | Killen et al. |
| 2002/0046276 | A1 | 4/2002 | Coffey et al. |
| 2002/0059492 | A1 | 5/2002 | Sabotta et al. |
| 2002/0083120 | A1 | 6/2002 | Soltis |
| 2002/0099914 | A1 | 7/2002 | Matsunami et al. |
| 2002/0133736 | A1 | 9/2002 | Faber et al. |
| 2002/0156984 | A1 | 10/2002 | Padovano |
| 2003/0028636 | A1* | 2/2003 | Cherkasova et al. .......... 709/225 |
| 2003/0061491 | A1 | 3/2003 | Jaskiewicz et al. |
| 2003/0097611 | A1 | 5/2003 | Delaney et al. |
| 2003/0105852 | A1* | 6/2003 | Das et al. ...................... 709/223 |
| 2003/0120743 | A1 | 6/2003 | Coatney et al. |
| 2004/0030668 | A1 | 2/2004 | Pawlowski et al. |
| 2004/0199515 | A1 | 10/2004 | Penny et al. |
| 2004/0199607 | A1 | 10/2004 | Reger et al. |
| 2004/0233910 | A1 | 11/2004 | Chen et al. |
| 2005/0015459 | A1* | 1/2005 | Gole et al. .................... 709/212 |
| 2005/0138154 | A1 | 6/2005 | Seto |
| 2005/0246401 | A1 | 11/2005 | Edwards et al. |
| 2006/0112247 | A1 | 5/2006 | Ramany et al. |
| 2006/0206671 | A1 | 9/2006 | Aiello et al. |
| 2007/0050538 | A1 | 3/2007 | Northcutt et al. |
| 2007/0088702 | A1 | 4/2007 | Fridella et al. |

FOREIGN PATENT DOCUMENTS

WO    WO 02/065298    8/2002

OTHER PUBLICATIONS

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981® 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglas, Fred, et al., *A comparison of two distributed systems: Amoeba and Sprite*—Computing Systems, 4(4), Fall 1991, pp. 353-385.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-215.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, Sigmod Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. and Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

U.S. Appl. No. 60/647,563 entitled "Coordinated Shared Storage Architecture", filed by Anthony Aiello et al.., on Jan. 27, 2005.

U.S. Appl. No. 11/075,618 entitled "System and Method for Distributing Enclosure Serviced Data to Coordinate Shared Storage" filed by George Kong et al., on Mar. 8, 2005.

U.S. Appl. No. 10/421,297 entitled "System and Method for Transport-Level Failover of FCP Devices in a Cluster", filed by Arthur Lent et al., on Apr. 23, 2003.

U.S. Appl. No. 60/647,562 entitled "System and Method for Distributing Enclosure Services Data to Coordinate Shared Storage", filed by Randy Thelen et al., on Jan. 27, 2005.

Reino, B. International Search Report for International Application No. PCT/US2006/002639, Jul. 27, 2006.

American National Standards Institute, Inc.; American National Standard for Information Technology; Fibre Channel—Physical and Signaling Interface (FC-PH); Nov. 14, 1994.

American National Standards Institute, Inc.; American National Standard for Information Technology—Fibre Channel Arbitrated Loop (FC-AL-2); Dec. 8, 1999.

SNIA Storage Networking Industry Association; Common Internet File System (CIFS), Version: CIFS-Spec 0.9. Work Group in Progress.

Fibre Channel Generic Services—3 (FC-GS-3), Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://stanards.ieee.org/regauth/oui/tutorials/fibreformat.html; Accessed on Aug. 6, 2001.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23, 1998, pp. 1-17, XP002194621.

Hu Yoshida: "LUN Security Considerations for Storage Area Networks" Hitachi Data Systems, 1999, pp. 1-7, XP002185193.

American National Standards Institute, Inc.; INCITS 305-1998 (R2003) "Information Technology—SCSI-3 Enclosure Services (SES) Command Set".

Hitz, David, et al. *System and Method for Enabling a Storage System to Support Multiple Volume Formats Simultaneously*, USPTO U.S. Appl. No. 60/652,626. Feb. 14, 2005.

\* cited by examiner

| | |
|---|---|
| MESSAGE | *505* |
| NEXT COMMAND BLOCK | *510* |
| PREVIOUS COMMAND BLOCK | *515* |
| ADAPTER INDEX | *520* |
| INITIATOR ID | *525* |
| COMMAND REFERENCE NUMBER | *530* |
| DATA DIRECTION | *535* |
| TASK CODE | *540* |
| COMMAND DESCRIPTOR BLOCK | *545* |
| LUN | *550* |
| TARGET ID | *555* |
| TASK MANAGEMENT FLAGS | *560* |
| DATA BUFFER | *565* |
| DATA LENGTH | *570* |
| TRANSFER LENGTH | *575* |
| AMOUNT TRANSFERRED | *580* |
| SCSI STATUS | *585* |
| RESPONSE CODE | *590* |
| SENSE DATA | *595* |
| ⋮ | *597* |

FIG. 5

COORDINATED SHARED STORAGE ARCHITECTURE

CROSS-REFERENCE TO RELATED APPLICATIONS

The present application claims the benefit of U.S. Provisional Patent Application Ser. No. 60/647,563, which was filed on Jan. 27, 2005, by Anthony Aiello for a COORDINATED SHARED STORAGE ARCHITECTURE and is hereby incorporated by reference.

RELATED APPLICATION

The present application is related to U.S. patent application Ser. No. 112056-0198U, entitled SYSTEM AND METHOD FOR DISTRIBUTING ENCLOSURE SERVICES DATA TO COORDINATE SHARED STORAGE, by Randy Thelen, et al, the contents of which are hereby incorporated by reference.

FIELD OF THE INVENTION

The present invention relates to storage systems and, in particular, to a coordinated shared storage architecture for use with a plurality of storage systems.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to operate according to a client/server model of information delivery to thereby allow many client systems (clients) to access shared resources, such as files, stored on the storage system. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as SCSI embedded in Fibre Channel (FCP). One example of a SAN arrangement, including a multi-protocol storage appliance suitable for use in the SAN, is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., now published as U.S. Patent Publication No. 2004/0030668 A1 on Feb. 12, 2004.

It is advantageous for the services and data provided by a storage system, such as a storage appliance, to be available for access to the greatest degree possible. Accordingly, some storage systems provide a plurality of storage appliances in a cluster, with a property that when a first storage appliance fails, the second storage appliance ("partner") is available to take over and provide the services and the data otherwise provided by the first storage appliance. When the first storage appliance fails, the second partner storage appliance in the cluster assumes the tasks of processing and handling any data access requests normally processed by the first storage appliance. One such example of a storage appliance cluster configuration is described in U.S. patent application Ser. No. 10/421,297, entitled SYSTEM AND METHOD FOR TRANSPORT-LEVEL FAILOVER OF FCP DEVICES IN A CLUSTER, by Arthur F. Lent, et al., now issued as U.S. Pat. No. 7,260,737 on Aug. 21, 2007. An administrator may desire to take a storage appliance offline for a variety of reasons including, for example, to upgrade hardware, etc. In such situations, it may be advantageous to perform a user-initiated takeover operation, as opposed to a failover operation. After the takeover operation is complete, the storage appliance's data is serviced by its partner until a giveback operation is performed.

In certain known storage appliance cluster configurations, the transport medium used for communication between clients and the cluster is Fibre Channel (FC) cabling utilizing the FCP protocol for transporting data. In SCSI terminology, clients operating in a SAN environment are initiators that initiate requests and commands for data. The multi-protocol storage appliance is thus a target configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique, e.g. World Wide Node Name (WWNN) and World Wide Port Name (WWPN). A Device Identifier is unique within a given FC switching fabric and is assigned dynamically to the FC port by a FC switch coupled thereto.

In conventional failover techniques involving clusters of storage appliances, each storage appliance in the cluster maintains two physical FC ports, namely an A port and a B port. The A port is utilized for processing and handling data access requests directed to the storage appliance. The B port typically is in a standby mode; when a failover situation occurs, the B port is activated and "assumes the identity" of its failed partner storage appliance. At that point, the B port functions as a FC target to receive and handle data access requests directed to the failed storage appliance. In this way, the surviving storage appliance may process requests directed to both the storage appliance and its failed partner storage appliance. Such a conventional FC failover is further described in the above-referenced patent application entitled SYSTEM AND METHOD FOR TRANSPORT-LEVEL FAILOVER OF FCP DEVICES IN A CLUSTER.

Specifically, the B port of the "surviving" storage appliance upon assuming the identity of its failed partner storage appliance, services data access requests direct to a WWNN and a WWPN of the partner. For many client operating systems, this is sufficient to permit clients to transparently access the surviving storage appliance as if it were the failed storage appliance. That is, the data access requests directed to these unique network address identifiers of the failed storage appliance are received and processed by the surviving storage appliance. Although it may appear to the clients as if the failed storage appliance was momentarily disconnected and reconnected to the network, data operations associated with the data access requests continue to be processed.

FIG. 1 is a schematic block diagram of an exemplary storage (appliance) system network environment 100. The environment 100 comprises a network cloud 102 coupled to a client 104. The client 104 may be a general-purpose computer, such as a PC or a workstation, or a special-purpose computer, such as an application server, configured to execute applications over an operating system that includes block access protocols. A storage system cluster 130, comprising Red Storage System 300A and Blue Storage System 300B, is also connected to the cloud 102. These storage systems are illustratively embodied as storage appliances configured to control storage of and access to interconnected storage devices, such as disks residing on disk shelves 112 and 114.

In the illustrated example, Red Storage System 300A is connected to Red Disk Shelf 112 by it's A port 116. The Red Storage System 300A also accesses Blue Disk Shelf 114 via its B port 118. Likewise, Blue Storage System 300B accesses Blue Disk Shelf 114 via A port 120 and Red Disk Shelf 112 through B port 122. Thus each disk shelf in the cluster is accessible to each storage appliance, thereby providing redundant is data paths in the event of a failover. It should be noted that the Red and Blue disk shelves are shown directly connected to the storage systems 200 for illustrative purposes only.

Connecting the Red and Blue Storage Systems 300A, B is a cluster interconnect 110, which provides a direct communication link between the two storage systems. The cluster interconnect 110 can be of any suitable communication medium, including, for example, an Ethernet connection or a FC data link.

During normal cluster operation, the storage system that is connected to a disk shelf via the disk shelf's primary (i.e., A) port is the "owner" of the disk shelf and is primarily responsible for servicing data requests directed to blocks on volumes contained on that disk shelf. Thus, in this example, the Red storage system 300A owns the Red Disk Shelf 112 and is primarily responsible for servicing data access requests for blocks contained on that disk shelf. Similarly, the Blue storage system 300B is primarily responsible for the Blue disk shelf 114. When operating as storage system cluster 130, each storage system 300 is typically configured to take over and assume data handling capabilities for the other disk shelf in the cluster 130.

Conventional storage system environment configurations include a number of noted disadvantages. One such disadvantage is that the cost of a spare disk is typically only amortized over the two storage systems of a cluster. That is, for each pair of storage systems a separate spare disk pool is required. In an environment having any number of clusters, the limitation may prove costly. That is, if a single cluster exhausts its spares, data may be lost even though other spares exist in the overall storage system environment. Secondly, load balancing may be performed among only the disks and/or storage systems operatively interconnected with the disk shelves. Thus, in a conventional cluster environment, load may only be balanced between the two storage systems in the storage system cluster. Another disadvantage is that conventional storage system clusters do not scale easily. To increase processing power or to alleviate a hotspot on a disk shelf, a system administrator is typically needed to manually add cluster pairs and associated disks, cabling, to the cluster configuration. Moreover, transfer of disk ownership may be required in response to such "manual" cluster scaling, thus necessitating physical movement of disks in a disk shelf among cluster pairs.

SUMMARY OF THE INVENTION

The present invention overcomes the disadvantages of the prior art by providing a novel coordinated shared storage architecture that permits the amortization of cost of the spares over any number of the storage systems and enables improvements to a number of storage system operations. The coordinated shared storage architecture comprises a plurality of storage systems disk shelves via a plurality of intermediate network devices, such as hubs. Each storage system includes a storage operating system having a target device driver module. The target device driver module permits the storage system to function as a SCSI target and thereby receive and process commands directed to it from other storage systems.

The coordinated shared storage architecture provides variety of useful applications or features within in a storage system environment that cannot be provided in a conventional storage system environment. For example, the novel architecture provides the ability to dynamically increase various capabilities of the storage system environment, such as efficiently enabling an additional storage system to be interconnected with the intermediate network devices. This feature of the invention enables all disks in the storage system environment to be serviced by the newly added storage system. Similarly, disk shelves can be efficiently added to the environment by simply connecting them to one or more intermediate network devices. Once connected, the storage space provided by the disks of the shelves is available to all of the storage systems of the environment.

BRIEF DESCRIPTION OF THE DRAWINGS

The above and further advantages of invention may be understood by referring to the following description in conjunction with the accompanying drawings in which like reference numerals indicate identical or functionally similar elements:

FIG. 5 is a schematic block diagram of a command block data structure in accordance with an embodiment of the present invention;

DETAILED DESCRIPTION OF ILLUSTRATIVE EMBODIMENTS

A. Clustered Storage System Environment

Figure 1:
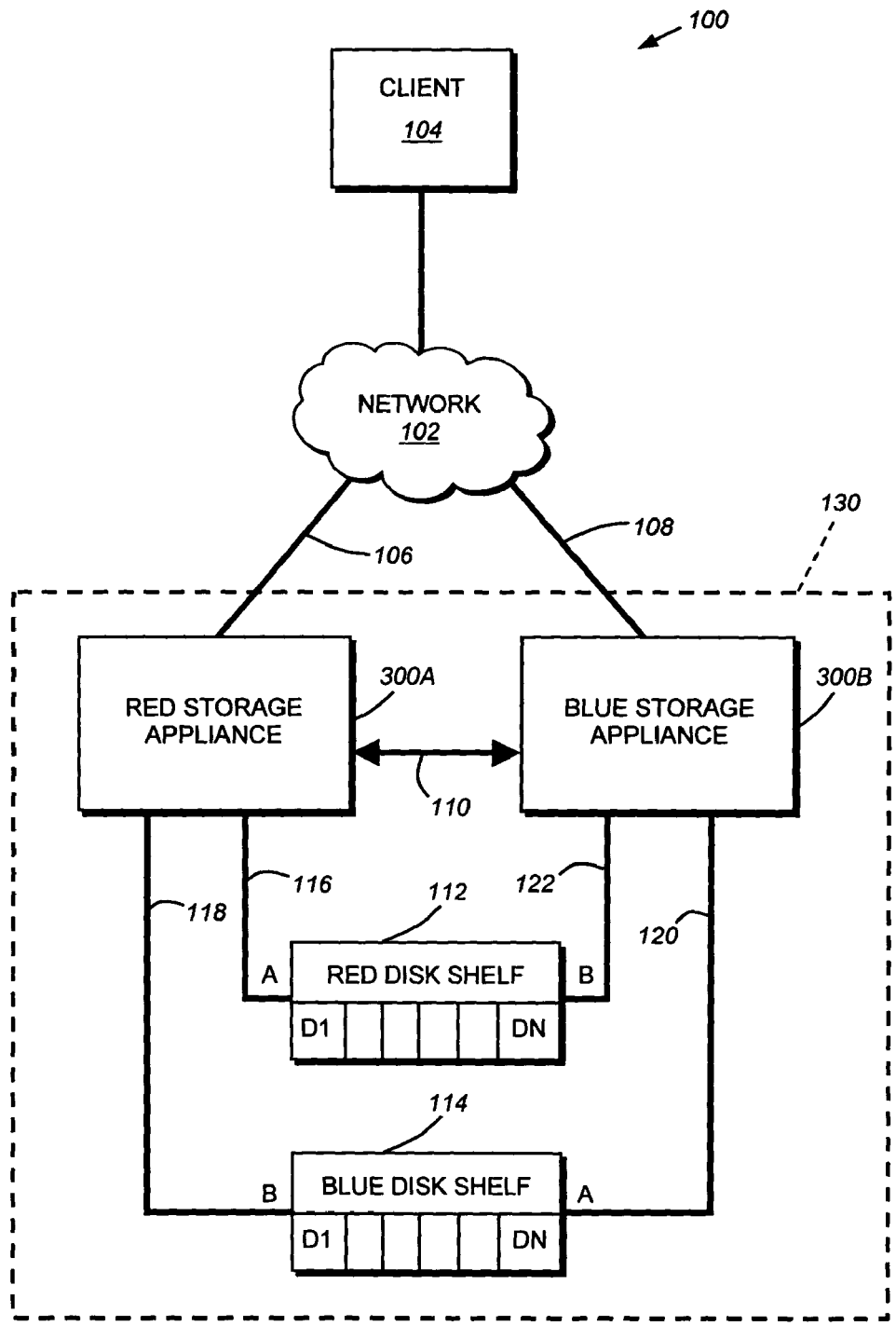
FIG. 1, previously described, is a schematic block diagram of an exemplary storage system cluster environment.
Figure 2:
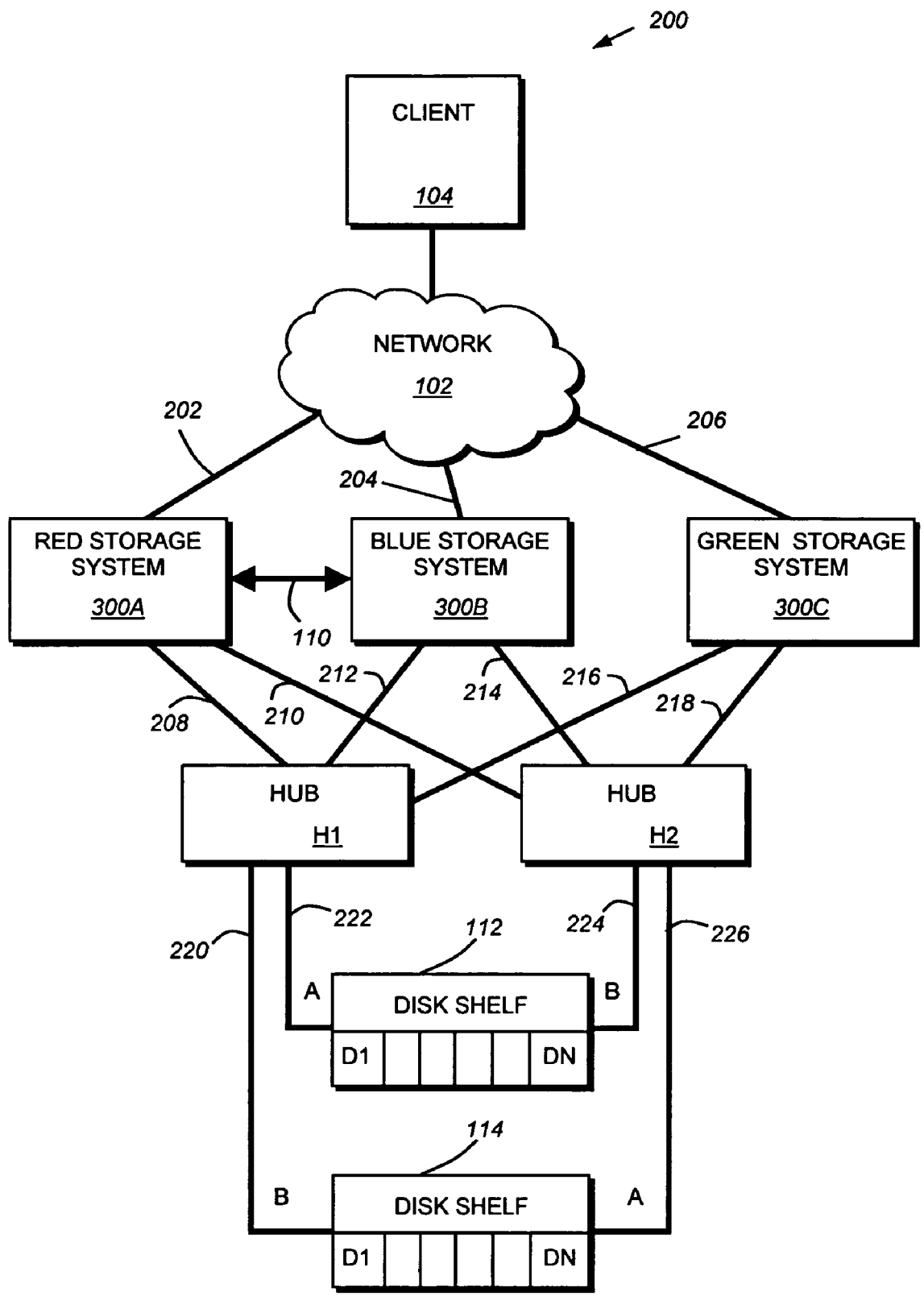
FIG. 2 is a schematic block diagram of a storage system environment in accordance with an embodiment of the present invention.

FIG. 2 is a schematic block diagram of an exemplary network environment 200 in which the principles of the present invention are implemented. The environment 200 comprises a network cloud 102 coupled to one or more clients 104. The client 104 may be a general-purpose computer, such as a PC or a workstation, or a special-purpose computer, such as an application server, configured to execute applications over an operating system that includes block access protocols. A Red Storage System 300A, Blue Storage System 300B and Green Storage System 300C are also connected to the cloud 102. These storage systems, described further below, are illustratively embodied as storage appliances configured to control storage of and access to interconnected storage devices, such as disks residing on disk shelves 112 and 114.

The Red, Blue and Green storage systems 300 A, B, C are connected to the network 102 via "front-end" data pathways 202, 204, 206 respectively. These front-end data pathways 202, 204, 206 may comprise direct point-to-point links or may represent alternate data pathways including various intermediate network devices, such as routers, switches, hubs, etc. In addition, exemplary intermediate network devices H1 and H2 are connected to the disk shelves 112 and 114. In the illustrative embodiment, H1 and H2 are interconnected with both the A and B ports of disk shelves 112, 114, thereby providing multiple "back-end" data pathways to both disk shelves. Specifically, H1 connects to disk shelf 112 via its A port 222 and to disk shelf 114 via its B port 220. Similarly, H2 connects to disk shelf 112 via its B port 224 and to disk shelf 114 via its A port 226. It should be noted that such data pathways can be any acceptable networking media including, for example, a Fibre Channel Arbitrated Loop (FC-AL). Red storage system 300 is connected to H1 via "intermediate" data pathway 208 and to H2 via intermediate data pathway 210, while Blue storage system 300B is connected to H1 via intermediate data pathway 212 and to H2 via intermediate data pathway 214. Finally, Green storage system 300C is connected to H1 via intermediate data pathway 216 and to H2 via intermediate data pathway 218.

In the exemplary embodiment, intermediate network devices H1, H2 are embodied as hubs. However, it is expressly contemplated that other types of intermediate network devices, such as switches may be utilized in accordance with alternate embodiments of the present invention. As such, the use of hubs as intermediate network devices should be taken as exemplary only. In accordance with an exemplary embodiment of the present invention, the novel storage network environment 200 permits several techniques to be employed that are directed to, for example, the scalability of storage systems and/or disks. Additionally, the storage environment 200 permits efficient amortization of a spare disk over all of the storage systems in the storage system environment while also permitting the ability to perform storage-based load balance among any of the storage systems in the storage system environment.

B. Storage Appliance

Figure 3:
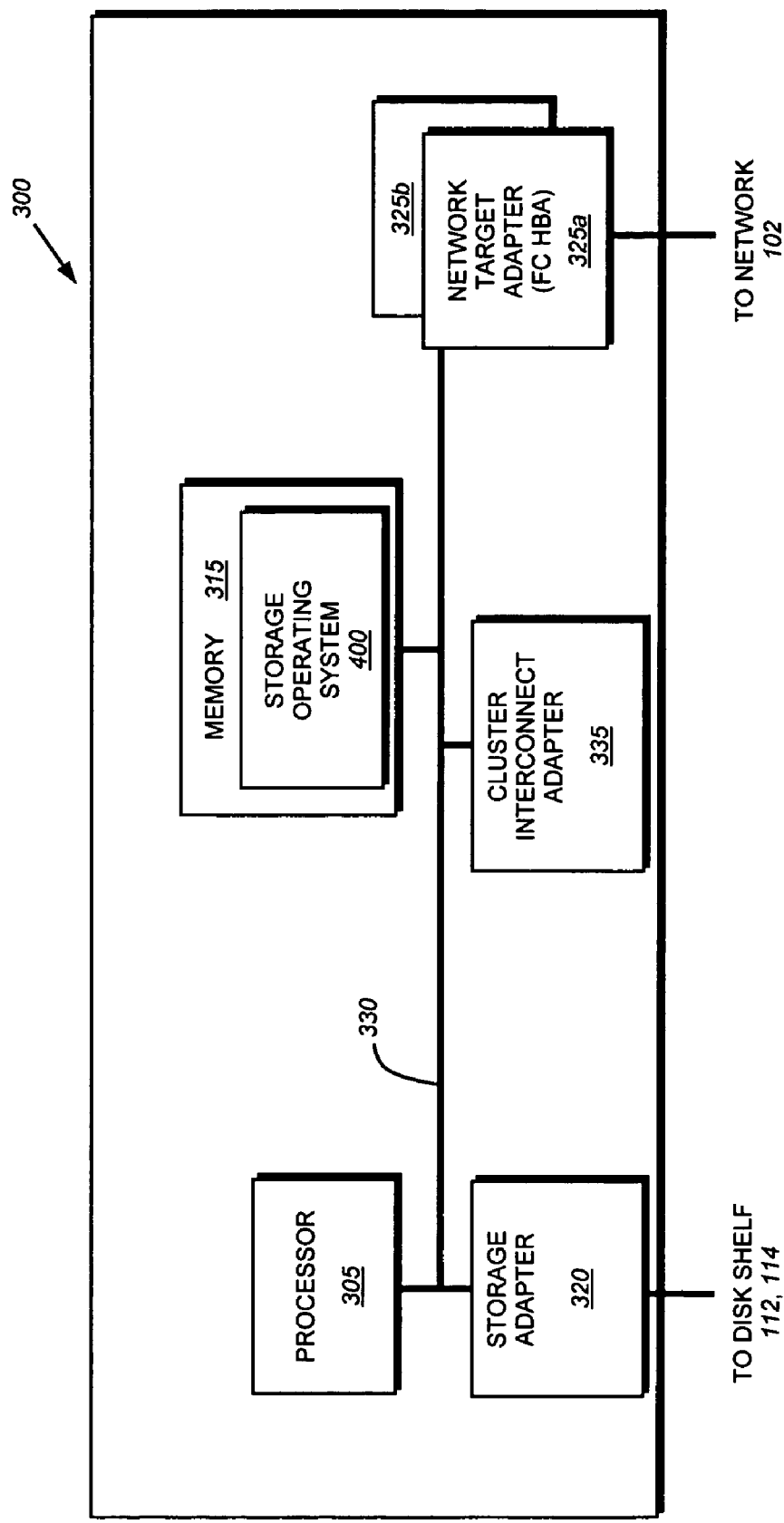
FIG. 3 is a schematic block diagram of a storage system in accordance with an embodiment of the present invention.

FIG. 3 is a schematic block diagram of an exemplary storage system 300 configured to provide storage service relating to the organization of information on storage devices, such as disks. The storage system 300 is illustratively embodied as a storage appliance comprising a processor 305, a memory 315, a plurality of network adapters 325a, 325b, a storage adapter 320 and a cluster interconnect adapter 335 interconnected by a system bus 330. A storage appliance is a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation. An example of such a storage appliance is described in U.S. patent application Ser. No. 10/215,917 entitled MULTI-PROTOCOL STORAGE APPLIANCE THAT PROVIDES INTEGRATED SUPPORT FOR FILE AND BLOCK ACCESS PROTOCOLS by Brian Pawlowski, et al., now published as U.S. Patent Publication No. 2004/0030668 A1 on Feb. 12, 2004. Note that the terms "storage system" and "storage appliance" are used interchangeably. The storage appliance 300 also includes a storage operating system 400 that provides a virtualization system to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the storage appliance 300 presents (exports) disks to SAN clients through the creation of luns or vdisk objects. A vdisk object (hereinafter "vdisk") is a special file type that is implemented by the virtualization system and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al., now issued as U.S. Pat. No. 7,107,385 on Sep. 16, 2006. The multi-protocol storage appliance thereafter makes these emulated disks accessible to the SAN clients through controlled exports, as described further herein.

In the illustrative embodiment, the memory 315 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 325a and b couple the storage appliance to clients over point-to-point links, wide area networks (WAN), virtual private networks (VPN) implemented over a public network (Internet) or a shared local area network (LAN) or any other acceptable networking architecture. The network adapters 325 a, b also couple the storage appliance 300 to clients 104 that may be further configured to access the stored information as blocks or disks. The network adapters 325 may comprise a FC host bus adapter (HBA) having the mechanical, electrical and signaling circuitry needed to connect the storage appliance 300 to the network 102. In addition to providing FC access, the FC HBA may offload FC network processing operations from the storage appliance's processor 305. The FC HBAs 325 may include support for virtual ports associated with each physical FC port. Each virtual port may have its own unique network address comprising a WWPN and WWNN.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 300.

The appliance 300 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 300) by issuing iSCSI and/or FCP messages over the network 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 320 cooperates with the storage operating system 400 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 305 (or the adapter 320 itself) prior to being forwarded over the system bus 330 to the network adapters 325a and b, where the information is formatted into packets or messages and returned to the clients.

Storage of information on the multi-protocol storage appliance 300 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed.

To facilitate access to the disks, the storage operating system 400 implements a write-anywhere file system that cooperates with virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate file system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 4:
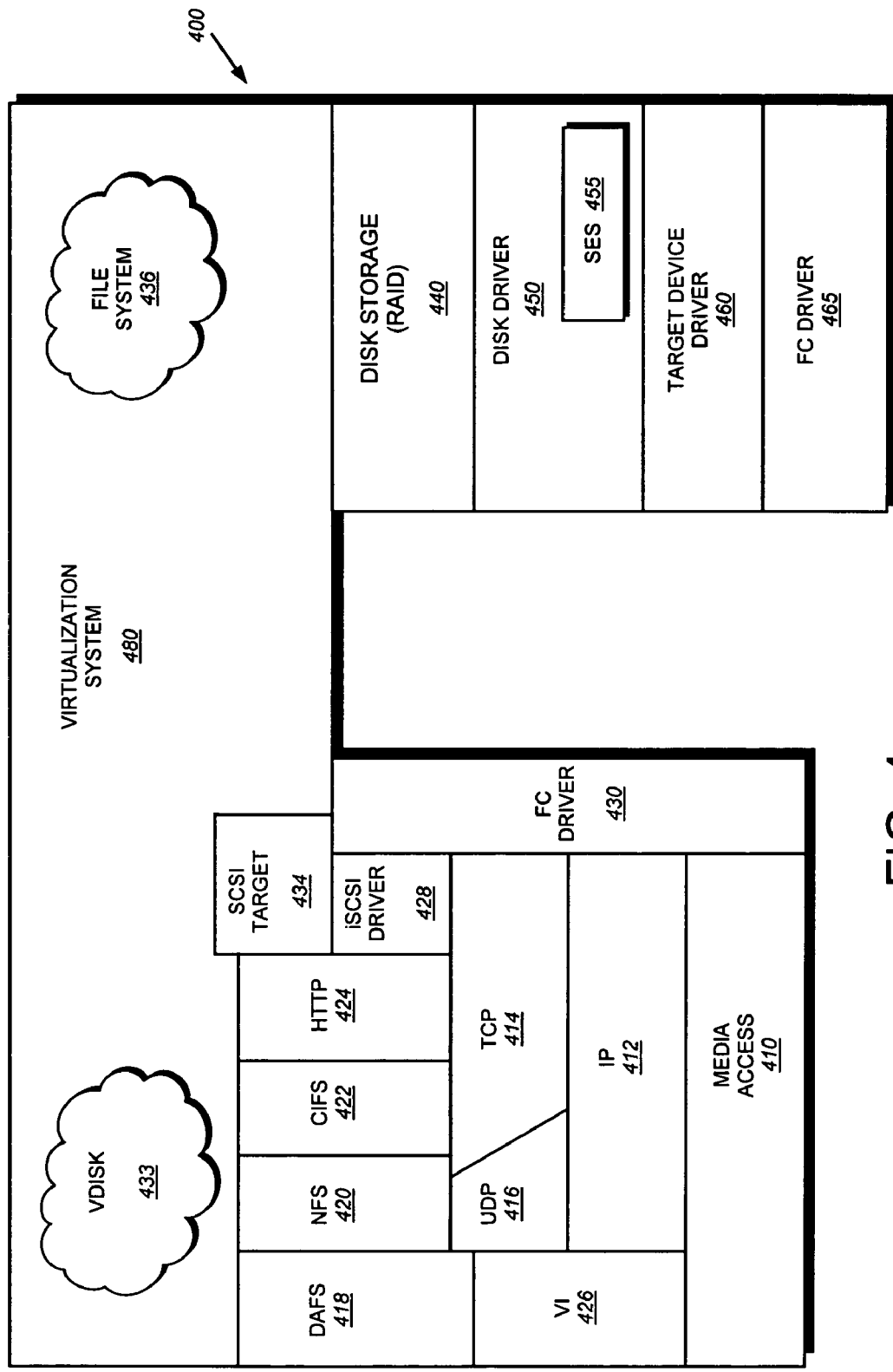
FIG. 4 is a schematic block diagram of a storage operating system in accordance with an embodiment of the present invention.

FIG. 4 is a schematic block diagram of the storage operating system 400 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access and, to that end, includes support for the Direct Access File System (DAFS) protocol 418, the NFS protocol 420, the CIFS protocol 422 and the Hypertext Transfer Protocol (HTTP) protocol 424. A Virtual Interface (VI) layer 426 implements the VI architecture to provide direct access transport (DAT) capabilities, such as Remote Direct Memory Access (RDMA), as required by the DAFS protocol 418.

An iSCSI driver layer 428 provides block protocol access over the TCP/IP network protocol layers, while a FC driver layer 430 operates with the FC HBA 325 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 440 that implements a disk storage protocol, such as a RAID protocol, and a disk driver layer 450 that implements a disk access protocol such as, e.g., a SCSI protocol.

A SCSI enclosure services (SES) module 455 operates in conjunction with the disk driver layer 450 to implement SES for the storage operating system 400. The SES module 455 utilizes a novel target device driver (TDD) module 460 to process incoming SES messages from other storage systems. The use of SES in a coordinated shared storage architecture is further described in the above-incorporated U.S. patent application Ser. No. 11/075,618 entitled SYSTEM AND METHOD FOR DISTRIBUTING ENCLOSURE SERVICES DATA TO COORDINATE SHARED STORAGE. In the illustrative embodiment, a FC driver module 465 controls the storage adapter 320. The target device driver enables the storage system to be accessed as a target device within the back-end storage network comprising the interconnected hubs, disks and storage systems. By utilizing the storage system as a target, techniques may be easily implemented in accordance with various embodiments of the present invention.

Bridging the disk software layers with the integrated network protocol stack layers is a virtualization system 480 that is implemented by a file system 436 interacting with virtualization software embodied as, e.g., vdisk module 433, and SCSI target module 434. These modules may be implemented as software, hardware, firmware or a combination thereof. The vdisk module 433 manages SAN deployments by, among other things, implementing a comprehensive set of vdisk (lun) commands that are converted to primitive file system operations ("primitives") that interact with the file system 436 and the SCSI target module 434 to implement the vdisks.

The SCSI target module 434, in turn, initiates emulation of a disk or lun by providing a mapping procedure that translates luns into the special vdisk file types. The SCSI target module is illustratively disposed between the FC and iSCSI drivers 428, 430 and the file system 436 to thereby provide a translation layer of the virtualization system 480 between the SAN block (lun) space and the file system space, where luns are represented as vdisks. By "disposing" SAN virtualization over the file system 436, the multi-protocol storage appliance reverses the approaches taken by prior systems to thereby provide a single unified storage platform for essentially all storage access protocols.

The file system 436 illustratively implements the Write Anywhere File Layout (WAFL) file system having an on-disk format representation that is block-based using, e.g., 4 kilobyte (KB) blocks and using inodes to describe the files. A further description of the structure of the file system is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

D. TDD Communication

The present invention overcomes the disadvantages of the prior art by providing a novel coordinated shared storage architecture that permits the amortization of cost of the spares over any number of the storage systems and enables improvements to a number of storage system operations. The present invention provides a coordinated shared storage architecture that permits use for storage based load balancing and sharing of spare storage devices among a plurality of storage systems. To that end, the novel target device driver module 460 of storage operating system 400 enables each storage system to function as a target and thereby receive and process commands from other storage systems in the environment. These commands are exchanged over the storage systems as messages associated with command blocks over the intermediate data pathways 206-218 network environment 200.

FIG. 5 is a schematic block diagram of a command block 500 in accordance with embodiment of the present invention. The command block 500 includes a message field 505, a next command block field 510, a previous command block field 515, an adapter index field 520, an initiator ID field 525, a command reference number field 530, a data direction field 535, a task code field 540, a command descriptor block field 545, a lun field 550, a target ID field 555, a task management flags field 560, a data buffer field 565, a data length field 570, a transfer length field 575, an amount transferred field 580, a SCSI status field 585, a response code field 590, a sense data field 595, and in alternate embodiments, additional fields 597. The message field 505 includes the message associated with the entire command block 500. This message may be one of a plurality of types depending on the desired operation.

The next and previous command block fields 510, 515 are utilized by the target device driver 460 to generate linked lists of messages for use in processing a plurality received or transmitted messages. The adapter index field 520 contains an index value of the particular adapter associated with the command block 500. The adapter index field 520 is utilized to track the continuation of messages into and the completion of messages to the adapter that provided a particular request. The initiator ID field 525 contains a loop FC ID of the initiator that provided the request. The command reference number field 530 includes a number for the command reinforced by the block 500. This reference number may be utilized for tracking a plurality of interrelated commands to ensure that they are executed in the proper order. The data direction field 535 provides an indication of the direction of data flow for the referenced command with respect to inventor's perspective. For example, a value of "IN" indicates that data flows to the initiator, whereas a value of "OUT" indicates that the data flows from the initiator.

The task code field 540 identifies a type of queuing to be performed for this command. The command descriptor block field 545 includes a conventional SCSI command block associated with the referenced command. The LUN field 550 identifies a target LUN of the command and the target ID field 555 contains the loop ID of the target. The task management flags field 560 contains private flags utilized by the target device driver to control the command block. The data buffer field 565 contains a pointer that references an allocated data buffer for the command block. The data length field 570 identifies the length of the allocated buffer referenced by the data buffer field 565. The transfer length field 575 contains a length value of the data transfer for the referenced command. This length value may not be greater than the value of the data length field 570. In the illustrative embodiment the SES module sets the length values this for all commands that it processes to inform the target device driver of exactly how many bytes are. The amount transferred field 580 is utilized by the target device driver to track the total amount of data transferred. The SCSI status field 585 contains the value of a status field of a conventional FCP response. The response code field 590 is utilized to report overrun or under run conditions, while the sense data field 595 contains a conventional SCSI sense code for the referenced command.

E. Allocating Spares in a Coordinated Shared Storage Architecture

One of the features provided by the novel coordinated shared storage architecture is the ability to amortize the cost of spare storage devices, e.g., disk drives, over all storage systems in a storage system environment. In the exemplary environment of FIG. 2, any disk on disk shelves 112, 114 may be accessed by any of the storage systems 300. As such, a spare disk physically located on any disk shelf may be utilized by any storage system to replace a failed disk.

Figure 6:
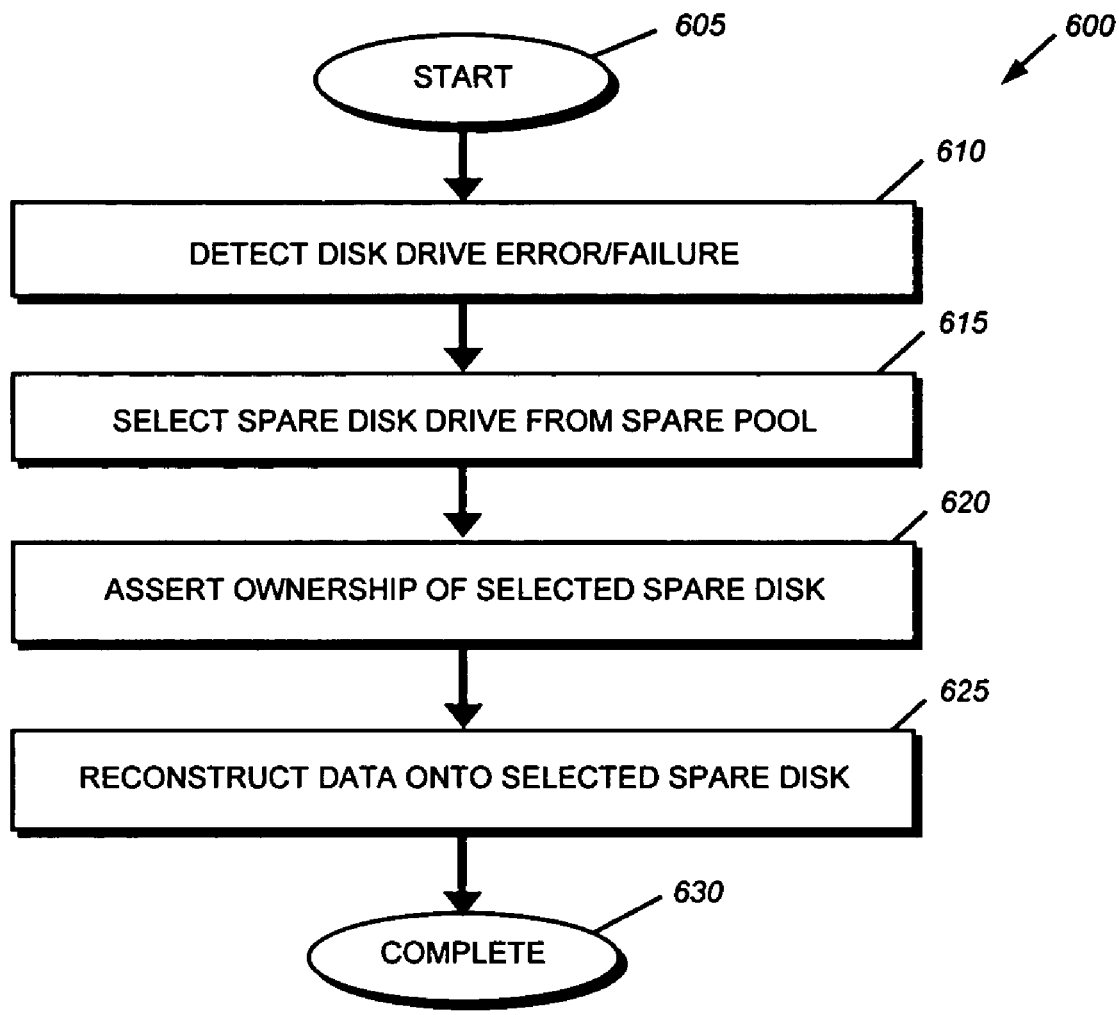
FIG. 6 is a flowchart detailing the steps of a procedure for selecting a spare disk from a spare disk pool in accordance with an embodiment of the present invention.

FIG. 6 is a flowchart detailing the steps of a procedure 600 for allocating a spare storage device from a spare pool in accordance with an embodiment of the present invention. As noted, the novel coordinated shared storage architecture enables amortization of costs of a spare disk among a plurality of storage systems. The procedure begins in step 605 and continues to step 610 where a storage system detects that a disk drive has suffered an error condition or otherwise failed. This may be detected through conventional FC queries as a result of SES information received from other storage systems.

Upon detecting the error condition, the storage operating system, in step 615, selects a spare disk drive from the spare pool. Illustratively, the spare pool may comprise either a separate disk shelf operatively interconnected with the intermediate network devices or a number of disks scattered among the disk shelves. It should be noted that selection of the spare disk may be accomplished using a variety of spare selection techniques. One such spare selection technique is described in U.S. patent application Ser. No. 10/027,013, entitled SYSTEM AND METHOD FOR ALLOCATING DISKS IN NETWORKED STORAGE by Alan L. Rowe, et al., now issued as U.S. Pat. No. 7,146,522 on Dec. 5, 2006. Of course, one skilled in the art will appreciate that alternate spare disk selection techniques may also be utilized.

Once the appropriate spare disk drive has been selected, the storage system asserts ownership of the selected spare disk in step 620. Here, ownership is asserted using, for example, sector S ownership techniques as described in U.S. patent application Ser. No. 10/027,457, entitled SYSTEM AND METHOD FOR IMPLEMENTING DISK OWNERSHIP IN NETWORKED STORAGE, by Susan M. Coatney, et al., now issued as U.S. Pat. No. 7,650,414 on Jan. 19, 2010. Once the ownership of the selected disk has been asserted, the storage system may begin reconstructing data onto the selected spare disk in step 625. Data reconstruction may be performed in accordance with conventional RAID techniques. The procedure then completes in step 630. In the illustrative embodiment, the spare pool may be located among any of the disk shelves interconnected with the intermediate network devices. As such, the spare pool may be shared among all of the storage systems in the storage environment, thereby reducing the total cost of ownership in of the storage environment. In a conventional two-cluster environment, the cost of a spare is amortize over the two storage systems, whereas using the novel coordinated shared storage environment of the present invention, the cost may be amortized over the N storage systems in the environment.

F. Dynamic Expansion of The Storage Environment

Figure 7:
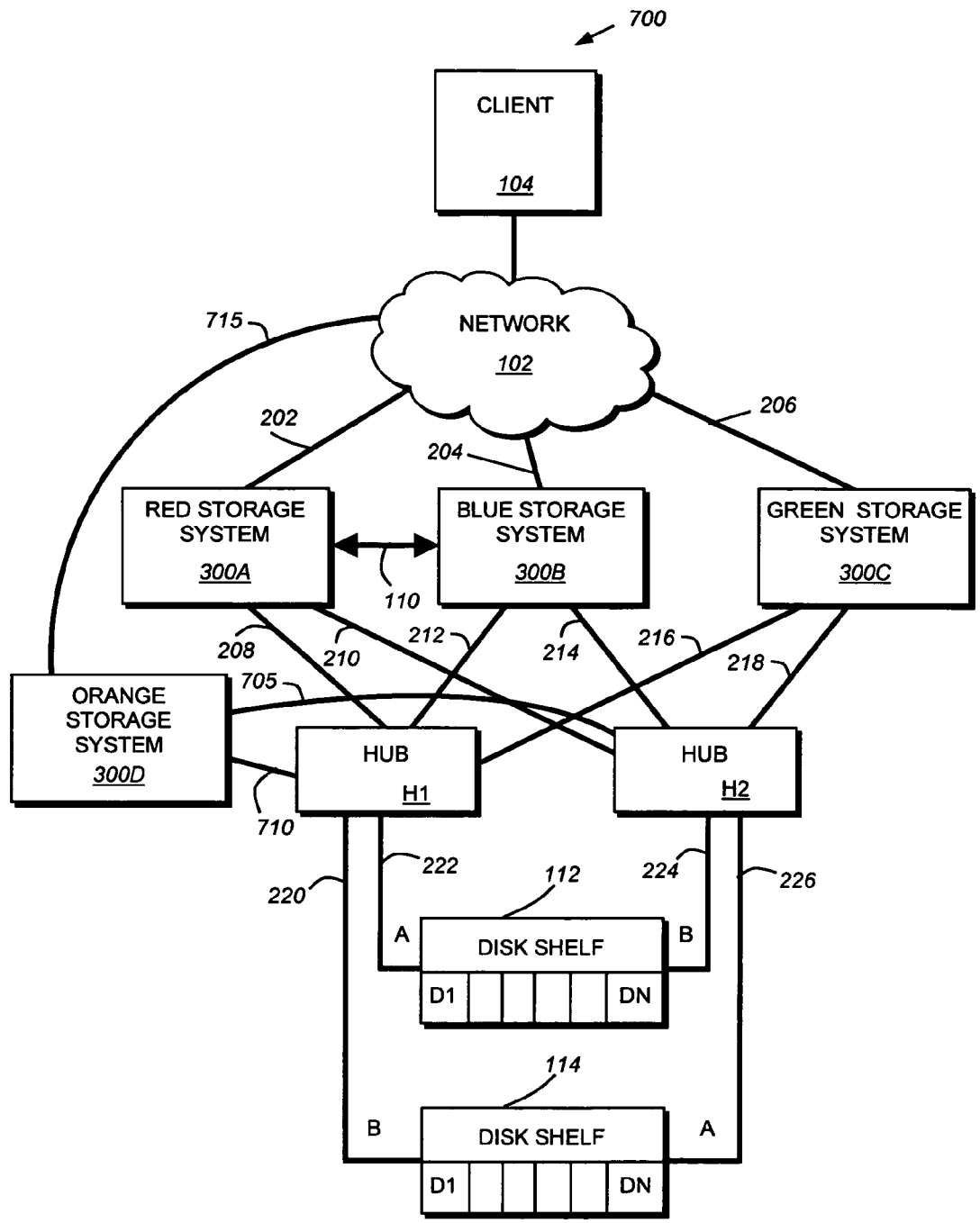
FIG. 7 is a schematic block diagram of a storage system environment showing the addition of additional storage systems in accordance with an embodiment of the present invention.

Another noted feature of the novel coordinated shared storage architecture is the ability to dynamically increase the various capabilities of the environment as needed. The increased capabilities facilitated by the novel coordinated shared storage system environment includes, inter alia, the insertion of additional storage systems, disk shelves or other network devices. For example, FIG. 7 shows a storage environment 700 in which Orange storage system 300D has been inserted into the storage system environment 200 of FIG. 2. Orange storage system 300D may be operatively interconnected into the environment by front-end data access pathway 715 to the network 102 and intermediate data access pathways 705,710 to the hubs H1, H2. Orange storage system 300D includes target device driver 460 in accordance with an embodiment of the present invention; as a result, the storage system 300D may, using conventional disk ownership techniques described above, take ownership over a set of disks stored on disk shelves 112,114 to thereby increase the processing power available for handling client originated data access requests. Thus, Orange storage system 300D may take ownership of a set of disks storing a heavily used volume to better distribute load among the storage systems 300 in the environment 700.

The novel coordinated shared storage architecture further permits rapid scaling of the storage system environment by the insertion of additional disk shelves served by storage systems. As each storage system is capable of communicating with the disks of each shelf that are operatively interconnected with the intermediate network devices, the need to rewire back-end data pathways is obviated.

Figure 8:
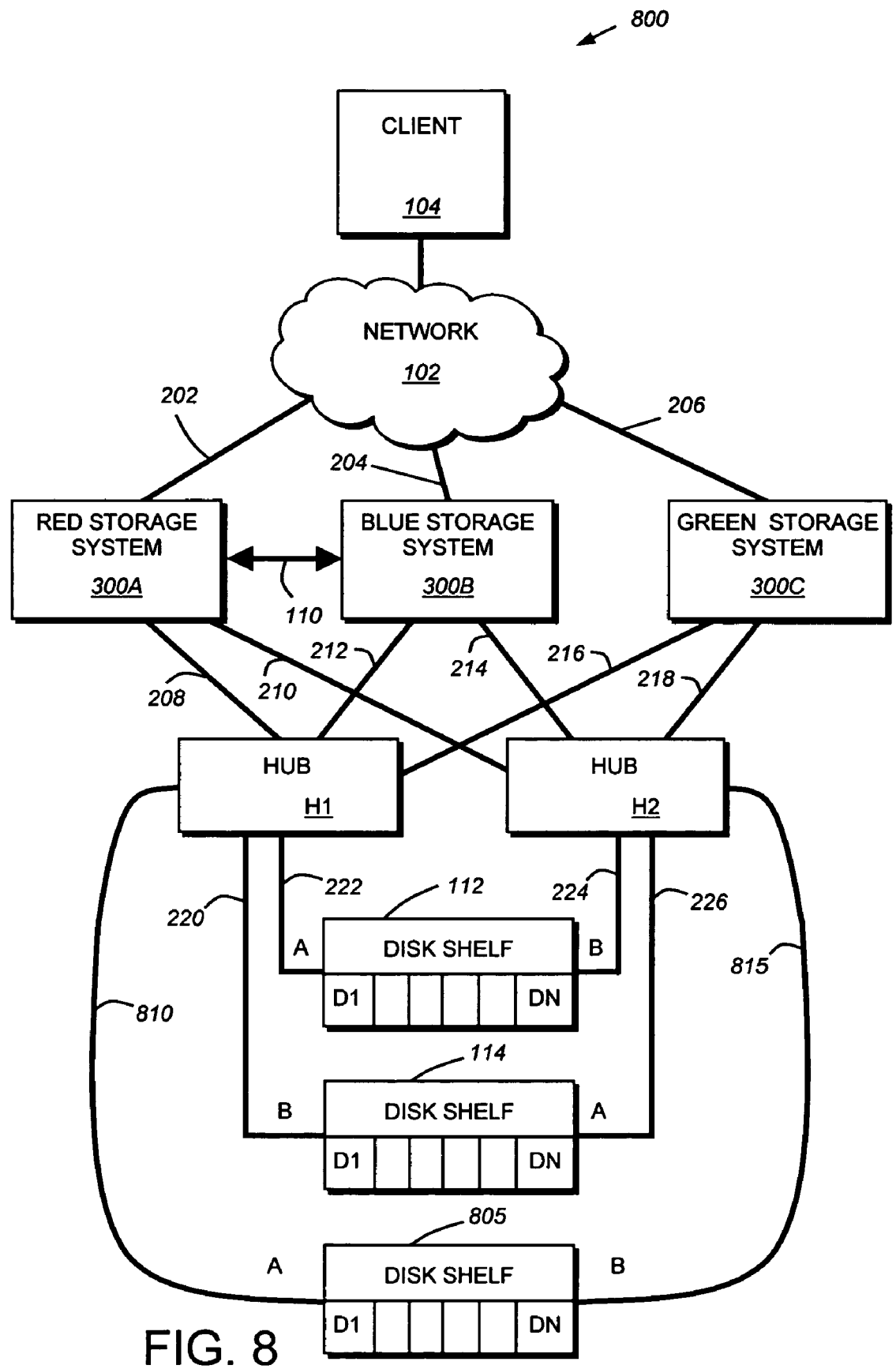
FIG. 8 is a schematic block diagram of a storage system environment showing the addition of additional disk shelves in accordance with an embodiment of the present invention.

FIG. 8 is a schematic block diagram of an exemplary storage environment 800 showing the insertion of an additional disk shelf 805 in accordance with an embodiment of the present invention. Here, a third disk shelf 805 is operatively interconnected with hubs H1, H2 via back-end data pathways 810, 815. In accordance with the illustrative embodiment, all disks within the disk shelf 805 are addressable by any of the storage systems 300 of the storage network 800. The insertion of disk shelf 805 may be necessitated by the need for additional storage for volumes associated with one or more of the storage systems 300. Additionally, the disk shelf 805 may be added to provide one or more spare disks for use by the environment 800 should a disk in one of the other disk shelves 112, 114 fail or otherwise suffer an error condition. Thus, in accordance with the novel coordinated shared storage architecture, disks may be dynamically added to the storage system environment 800 for use by any of the storage systems 300 in the environment.

Figure 9:
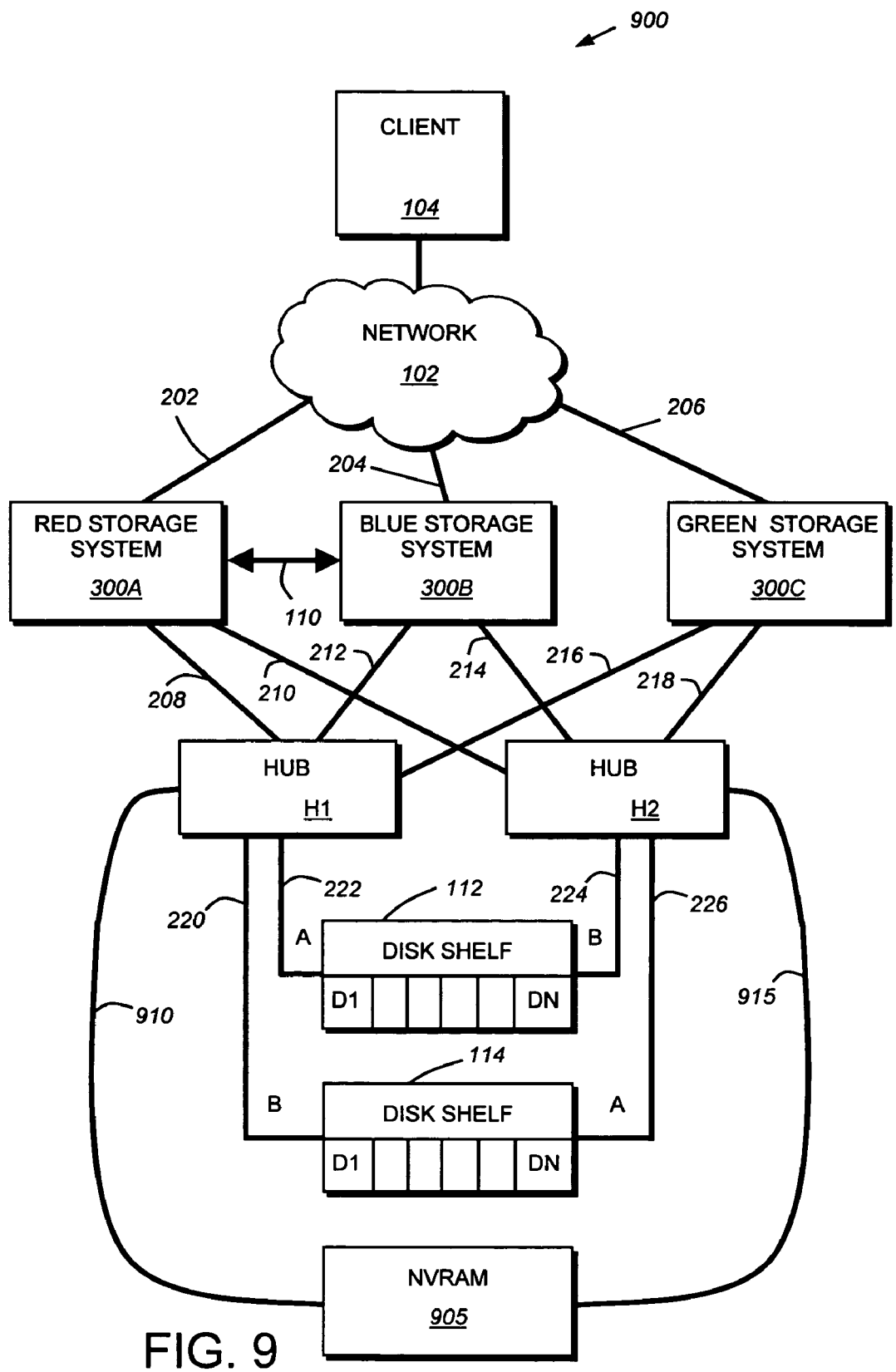
FIG. 9 is a schematic block diagram of a storage system environment showing the addition of a non-volatile random access memory (NVRAM) device in accordance with an embodiment of the present invention.

FIG. 9 is a schematic block diagram of an exemplary storage environment 900 showing the addition of a non-volatile random access memory (NVRAM) device 905 in accordance with an embodiment of the present invention. In the exemplary environment 900 the NVRAM device 905 may be utilized by the storage systems to "stage" (store) data prior to its being written to disk. Storage systems typically do not acknowledge data access requests until those requests are persistently stored in, e.g. a persistent memory, such as non-volatile memory or disk. A noted disadvantage of storing data directly on disk is the time required to write data to a disk. Under heavy loads, a disk subsystem may become a bottleneck, thereby forcing the storage system to wait until the disks have stored large amounts of data before acknowledging requests from clients. In accordance with an embodiment of the present invention, a data access request received by the storage system may be stored directly on the NVRAM device 905, which then permits the storage system to acknowledge the data access request. Since storing the request on NVRAM is typically substantially faster than storing it on a physical disk device, storage system performance is increased. A separate process executing within the storage system may thereafter perform a "lazy write" operation to transfer the data of the request from the NVRAM device to disk, or may "flush" that data from the NVRAM device 905 at periodic time intervals. It should be noted that while this embodiment is described in terms of NVRAM, any suitable persistent storage is acceptable, including, e.g., Flash RAM.

Figure 10:
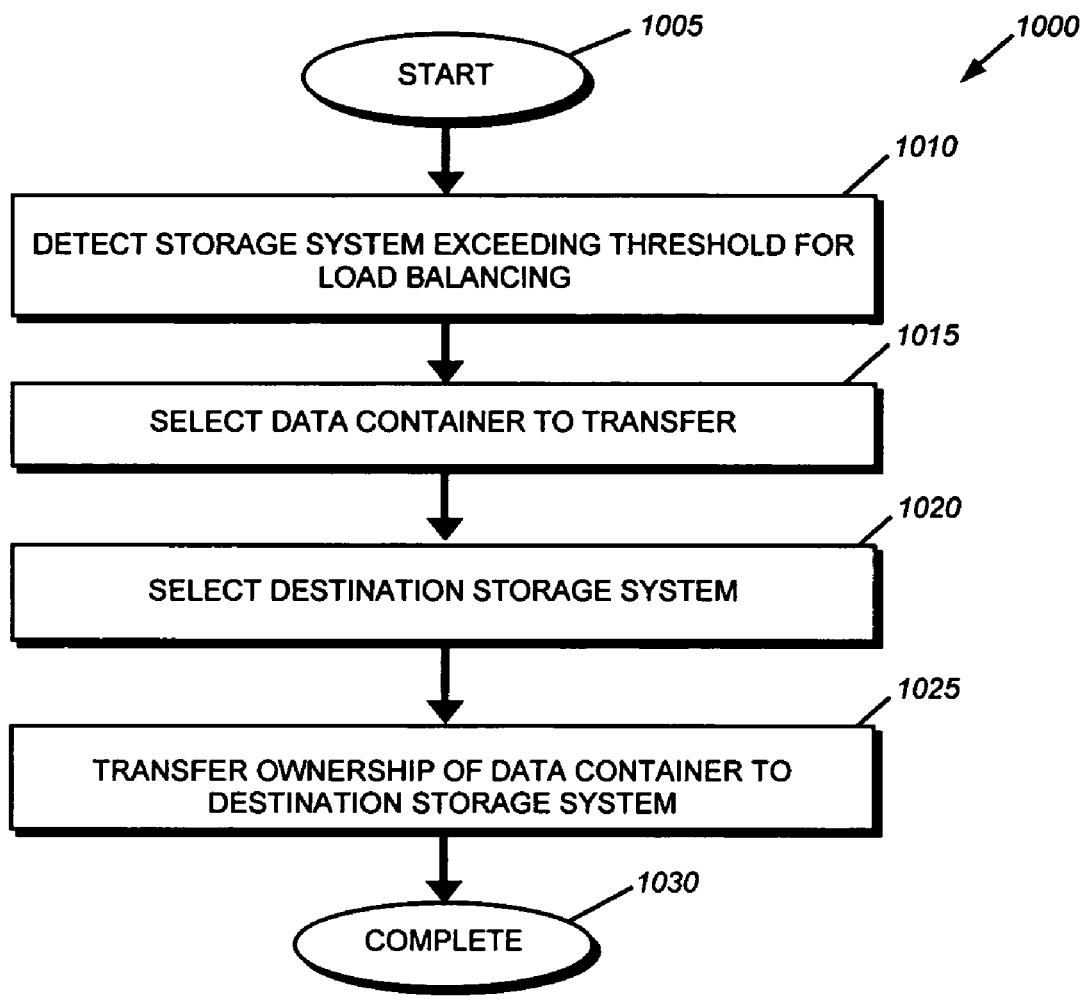
FIG. 10 is a flowchart detailing the steps of a load balancing procedure in accordance with an embodiment of the present invention.

Another noted feature of the novel coordinated shared storage architecture is the ease with which storage workload of, e.g. a data container may be dynamically balanced among the various storage systems and storage devices in the environment. FIG. 10 is a flowchart detailing the steps of a procedure 1000 for load balancing a data container between two storage systems. A data container may comprise a volume, aggregate or other quantum of data that may be individually serviced by the storage systems. Aggregates are further described in U.S. patent application Ser. No. 10/836,817, entitled EXTENSION OF WRITE ANYWHERE FILE LAYOUT, by John K. Edwards, et al., now issued as U.S. Pat. No. 7,409,494 on Aug. 5, 2008. The procedure 1000 begins in step 1005 and continues to step 1010 where a "source" storage system detects that is exceeding a predefined threshold for load balancing. This threshold may be set in a number of ways including, for example, a number of operations directed to a particular data container per unit time, a percentage of the processor being utilized, etc. Once the threshold has been exceeded, the procedure, in step 1015, selects a data container to transfer and then, in step 1020, selects a "destination" storage system. A destination storage system may be selected based on a variety of conventional load balancing determinants including, for example, the percentage of processor that is unutilized, etc.

In step 1025, the source storage system transfers ownership of the data container to the destination storage system. As both the source and destination storage systems utilize the same storage devices that are operatively interconnected with the intermediate network devices, ownership of the data container may be transferred by transferring ownership of the disks containing the data container. Such ownership may be implemented as described in the above-referenced U.S. Pat. No. 7,650,414, entitled SYSTEM AND METHOD FOR IMPLEMENTING DISK OWNERSHIP IN NETWORKED STORAGE. The procedure then completes in step 1030. Another example of load balancing in the novel coordinated shared storage architecture environment is further described in U.S. patent application Ser. No. 10/992,893, entitled SYSTEM AND METHOD FOR REAL-TIME BALANCING OF USER WORKLOAD ACROSS MULTIPLE STORAGE SYSTEMS WITH SHARED BACK END STORAGE., by Swaminathan Ramany, et al., now issued as U.S. Pat. No. 7,523,286 on Apr. 21, 2009.

To again summarize, the present invention is directed to a novel coordinate shared storage architecture that permits communication among a plurality of disk shelves and a plurality of storage systems through intermediate network devices, such as hubs. By leveraging the novel coordinated shared storage architecture, a variety of improved storage environment features may be realized. One feature is that the cost of spare storage devices may be amortized over all storage systems in the storage system environment, thereby reducing total cost of ownership and eliminating the need for duplicative spare storage pools.

A second feature is the ability to dynamically add resources to accommodate the changing needs of the storage environment. For example, storage systems may be added to the storage environment by operatively interconnecting them with the network to clients and with one or more of the intermediate network devices. The newly added storage system may then communicate with all disk shelves and that are operatively interconnected with the intermediate network devices. Similarly, additional storage may be inserted into the environment by connecting one or more disk shelves or disks to the intermediate network devices. The newly added storage devices are then addressable by all storage systems in the environment.

A third feature of the invention is the ability to add a back-end storage device, such as a non- volatile random access memory (NVRAM) device, to the network environment. The back-end storage device may be utilized to store data in a NVRAM faster then by utilizing conventional disk drives. This also permits the elimination of NVRAM or the like from each individual storage system. A fourth feature that is advantageously provided by the novel coordinated shared storage architecture is the ability to load balance among one or more storage systems by transferring ownership of one or more data containers from a storage system that is exceeding a load balancing threshold to a lesser utilized storage system.

The foregoing description has been directed to specific embodiments of this invention. It will be apparent, however, that other variations and modifications may be made to the described embodiments, with the attainment of some or all of their advantages. Specifically, it should be noted that any number of HBAs may be utilized in accordance with the invention. Additionally, any number of virtual ports may be associated with a given physical port. The procedures or processes described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for configuring a coordinated shared storage architecture utilizing a plurality of storage appliances, comprising:
   operatively interconnecting the plurality of storage appliances organized as a cluster of storage appliances, wherein each storage appliance provides both storage area network (SAN) services through SAN virtualization and network attached storage (NAS) services through a file system;
   operatively interconnecting one or more sets of data storage devices with the plurality of storage appliances using at least one intermediate network device;
   sharing the one or more sets of data storage devices among at least two storage appliances of the plurality of storage appliances; and
   enabling the at least two storage appliances to be accessed as a Small Computer Systems Interface (SCSI) target device by providing a target device driver in each of the at least two storage appliances in the cluster, the target device driver enabling each of the at least two storage appliances to function as the SCSI target device to receive and process a SCSI command sent via the at least one intermediate network device from storage appliances in the cluster to access any of the shared one or more sets of data storage devices.

2. The method of claim 1 wherein the at least one intermediate network device comprises a hub.

3. The method of claim 1 wherein the at least one intermediate network device comprises a router.

4. The method of claim 1 wherein the one or more sets of data storage devices comprise disk drives.

5. The method of claim 1 further comprising providing an additional storage appliance operatively interconnected with a first network and with the at least one intermediate network device, the additional storage appliance configured to access any of the one or more sets of data storage devices operatively interconnected with the at least one intermediate network device.

6. The method of claim 1 further comprising providing an additional data storage device operatively interconnected with the at least one intermediate network device, whereby any of the plurality of storage appliances operatively interconnected with the at least one intermediate network device is capable of addressing the additional data storage device.

7. The method of claim 1 further comprising providing a non-volatile random access memory device operatively interconnected with the at least one intermediate network device, the non-volatile random access memory device configured to store data transmitted by a storage appliance of the plurality of storage appliances before the data is stored on one of the plurality of storage devices.

8. A system for configuring a plurality of storage appliances, comprising:
   the plurality of storage appliances, each of the plurality of storage appliances comprising a processor, each of the storage appliances configured to operate as a cluster of storage appliances, wherein at least one storage appliance provides both storage area network (SAN) services through SAN virtualization and network attached storage (NAS) services through a file system;
   at least one intermediate network device comprising a processor configured to operatively interconnect one or more sets of data storage devices with the plurality of storage appliances;
   at least two of the storage appliances of the plurality of storage appliances further configured to share the sets of data storage devices; and
   a target device driver of the at least two storage appliances in the cluster configured to enable each of the at least two storage appliances to be accessed as a Small Computer Systems Interface (SCSI) target device to receive and process a SCSI command directed to either of the at least two storage appliances from a storage appliance to access any of the shared sets of data storage devices, wherein the SCSI commands are sent from the storage appliance via the at least one intermediate network device.

9. The system of claim 8 wherein the one or more sets of data storage devices comprise disk drives.

10. The system of claim 8 wherein the at least one intermediate network devices comprises a hub.

11. The system of claim 8 wherein the at least one intermediate network devices comprises a switch.

12. The system of claim 8 wherein the at least one intermediate network devices comprises a router.

13. The system of claim 8 further comprising an additional storage appliance operatively interconnected with one of the at least one intermediate network device, the additional storage appliance configured to access any of the one or more sets of data storage devices that are operatively interconnected with the at least one intermediate network device.

14. The system of claim 8 further comprising a non-volatile random access memory device operatively interconnected with at least one intermediate network device, the non-volatile random access memory device configured to store data transmitted by at least one of the plurality of storage appliances before the data is stored on at least one data storage device of the one or more sets of data storage devices.

15. The system of claim 8 further comprising an additional data storage device, the additional data storage device operatively interconnected with the at least one intermediate network device, whereby any of the plurality of storage appliances is operatively interconnected with the at least one intermediate network device is capable of addressing the additional data storage device.

16. A non-transitory computer readable storage medium containing executable program instructions executed by a processor, comprising:
   program instructions that operatively interconnect a plurality of storage appliances organized as a cluster of storage appliances, wherein each storage appliance provides both storage area network (SAN) services through SAN virtualization and network attached storage (NAS) services through a file system;
   program instructions that operatively interconnect one or more sets of data storage devices with the plurality of storage appliances using at least one intermediate network device;

program instructions that share the one or more sets of data storage devices among at least two storage appliances of the plurality of storage appliances; and program instructions that enable the at least two storage appliances to be accessed as a Small Computer Systems Interface (SCSI) target device by providing a target device driver in each of the at least two storage appliances in the cluster, the target device driver enabling each of the at least two storage appliances to function as the SCSI target device to receive and process a SCSI command sent via the at least one intermediate network device from storage appliances in the cluster to access any of the shared one or more sets of data storage devices.

17. The non-transitory computer readable storage medium of claim 16 wherein the at least one intermediate network devices comprises a hub.

18. The non-transitory computer readable storage medium of claim 16 wherein the at least one intermediate network devices comprises a router.

19. The non-transitory computer readable storage medium of claim 16 wherein the one or more sets of one or more data storage devices comprises a disk drive.

20. The non-transitory computer readable storage medium of claim 16 further comprising:
program instructions that provide an additional storage appliance operatively interconnected with one of the at least one intermediate network device, the additional storage appliance configured to access any data storage device operatively interconnected with the at least one intermediate network device.

21. The non-transitory computer readable storage medium of claim 16 further comprising:
program instructions that provide an additional data storage device, operatively interconnected with the at least one intermediate network device, whereby any of the plurality of storage appliances operatively interconnected with the at least one intermediate network device is capable of addressing the additional data storage device.

22. The non-transitory computer readable storage medium of claim 16 further comprising:
program instructions that provide a non-volatile random access memory device operatively interconnected with the at least one intermediate network device, the non-volatile random access memory device configured to store data transmitted by the plurality of the storage appliances before the data is stored on a data storage device of the one or more sets of storage devices.

23. A method, comprising:
operatively interconnecting a plurality of storage appliances organized as a cluster of storage appliances, wherein each storage appliance provides both storage area network (SAN) services through SAN virtualization and network attached storage (NAS) services through a file system;
operatively interconnecting one or more sets of data storage devices with the plurality of storage appliances using at least one intermediate network device;
sharing the one or more sets of data storage devices among at least two storage appliances of the plurality of storage appliances; and
providing a target device driver in two or more of the plurality of storage appliances, the target device driver enabling the two or more storage appliances to function as one or more Small Computer Systems Interface (SCSI) target devices to receive and process a SCSI command sent from a storage appliance via the at least one intermediate network device.

24. The method of claim 23 wherein the at least one intermediate network device comprises a hub.

25. The method of claim 23 further comprising providing an additional storage appliance operatively interconnected with the at least one intermediate network device, wherein the additional storage appliance enables access to any of the storage devices operatively interconnected with the at least one intermediate network device.

26. The method of claim 23 further comprising providing an additional data storage device operatively interconnected with the at least one intermediate network device, whereby any of the plurality of storage appliances operatively interconnected with the at least one intermediate network device is capable of addressing the additional data storage device.

27. The method of claim 23 further comprising:
providing a non-volatile random access memory device operatively interconnected with the at least one intermediate network device; and storing data transmitted on the non-volatile random access memory device by a particular storage appliance of the plurality of storage appliances before the data is stored on one of the data storage devices of the set of data storage devices.

28. A computer data storage system, comprising:
a plurality of storage appliances, each comprising a processor, each of the storage appliances configured to be operatively interconnected as a cluster, wherein each storage appliance provides both storage area network (SAN) services through SAN virtualization and network attached storage (NAS) services through a file system;
at least one intermediate network device comprising a processor configured to operatively interconnect one or more sets of data storage devices with the plurality of storage appliances in the cluster, wherein the one or more sets of data storage devices are shared among at least two storage appliances of the plurality of storage appliances; and
a target device driver of each storage appliance configured to enable a first storage appliance in the cluster to receive and process a Small Computer Systems Interface (SCSI) command sent from a second storage appliance in the cluster as a SCSI target, wherein the SCSI command is sent via the at least one intermediate network device.

* * * * *

UNITED STATES PATENT AND TRADEMARK OFFICE
CERTIFICATE OF CORRECTION

PATENT NO. : 8,180,855 B2
APPLICATION NO. : 11/075619
DATED : May 15, 2012
INVENTOR(S) : Anthony F. Aiello et al.

It is certified that error appears in the above-identified patent and that said Letters Patent is hereby corrected as shown below:

Col. 1, line 16 should read: "Ser. No. ~~112056-0198U~~ 11/075,618, entitled SYSTEM AND METHOD"

Col. 3, line 55 should read: "redundant ~~is~~ data paths in the event of a failover. It should be"

Signed and Sealed this
Tenth Day of July, 2012

David J. Kappos
*Director of the United States Patent and Trademark Office*